United States Patent
Simon et al.

(10) Patent No.: US 10,449,927 B2
(45) Date of Patent: Oct. 22, 2019

(54) STEERING SYSTEM HAVING ANTI-THEFT CAPABILITIES

(71) Applicant: STEERING SOLUTIONS IP HOLDING CORPORATION, Saginaw, MI (US)

(72) Inventors: Daniel C. Simon, Freeland, MI (US); Bruce M. Collier, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 28 days.

(21) Appl. No.: 15/486,726

(22) Filed: Apr. 13, 2017

(65) Prior Publication Data
US 2018/0297555 A1    Oct. 18, 2018

(51) Int. Cl.
| | |
|---|---|
| *B60R 25/02* | (2013.01) |
| *B60R 25/08* | (2006.01) |
| *G05D 1/00* | (2006.01) |
| *B60W 10/20* | (2006.01) |
| *B60W 10/18* | (2012.01) |
| *B60R 25/30* | (2013.01) |
| *B62D 6/00* | (2006.01) |
| *B60W 50/00* | (2006.01) |
| *B62D 5/00* | (2006.01) |

(Continued)

(52) U.S. Cl.
CPC ............ *B60R 25/02* (2013.01); *B60W 10/18* (2013.01); *B60W 10/20* (2013.01); *B60W 50/0098* (2013.01); *B62D 5/001* (2013.01); *B60W 50/082* (2013.01); *B60W 2040/0809* (2013.01); *B60W 2540/04* (2013.01); *B60W 2540/28* (2013.01); *B60W 2710/18* (2013.01); *B60W 2710/20* (2013.01)

(58) Field of Classification Search
None
See application file for complete search history.

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

Chinese Office Action & Search Report for Chinese Application No. 201510204221.5 dated Aug. 29, 2016, 5 pages, no English translation available.

(Continued)

*Primary Examiner* — Todd M Melton (57) ABSTRACT

A steering system for an autonomous or semi-autonomous vehicle is provided. The steering system includes a controller that is in communication with an electric power steering system and a transmission control system. The controller is programmed to, in response to a first signal indicative of a non-verified operator and a request to operate, place the electric power steering system in a standby mode and inhibit the transmission control system from changing at least one of a transmission operational state and a transmission operational position.

18 Claims, 3 Drawing Sheets

(51) Int. Cl.
*B60W 40/08* (2012.01)
*B60W 50/08* (2012.01)

(56) References Cited

U.S. PATENT DOCUMENTS

| | | |
|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 6,889,792 B1 * | 5/2005 | Fardoun .................. B60R 25/02 180/287 |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,170,751 B2 | 5/2012 | Lee et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,798,852 B1 * | 8/2014 | Chen ...................... G06F 21/44 701/29.6 |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,845,109 B2 | 12/2017 | George et al. |
| 9,852,752 B1 | 12/2017 | Chou et al. |
| 9,868,449 B1 | 1/2018 | Holz et al. |
| 10,040,330 B2 | 8/2018 | Anderson |
| 10,137,929 B2 | 11/2018 | Aoki et al. |
| 2002/0016661 A1 | 2/2002 | Frediani et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0133330 A1 | 7/2004 | Ono et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |

(56) References Cited

U.S. PATENT DOCUMENTS

| | | |
|---|---|---|
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle et al. |
| 2010/0250081 A1 | 9/2010 | Kinser et al. |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0070933 A1 | 3/2014 | Gautama et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0306799 A1* | 10/2014 | Ricci ............... H04W 4/21 340/5.83 |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120124 A1 | 4/2015 | Bartels et al. |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0314804 A1 | 11/2015 | Aoki et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0280251 A1 | 9/2016 | George et al. |
| 2016/0288825 A1 | 10/2016 | Varunjikar et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer et al. |
| 2016/0375923 A1 | 12/2016 | Schulz et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau et al. |
| 2016/0375931 A1 | 12/2016 | Lubischer |
| 2017/0029009 A1 | 2/2017 | Rouleau |
| 2017/0029018 A1 | 2/2017 | Lubischer |
| 2017/0066473 A1 | 3/2017 | Yu et al. |
| 2017/0101032 A1 | 4/2017 | Sugioka et al. |
| 2017/0101127 A1 | 4/2017 | Varunjikar et al. |
| 2017/0113712 A1 | 4/2017 | Watz et al. |
| 2017/0151977 A1 | 6/2017 | Varunjikar et al. |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0203785 A1 | 7/2017 | Naik et al. |
| 2017/0225704 A1 | 8/2017 | Urushibata |
| 2017/0232998 A1 | 8/2017 | Ramanujam et al. |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305425 A1 | 10/2017 | Xing |
| 2017/0305458 A1 | 10/2017 | Wang et al. |
| 2018/0015948 A1 | 1/2018 | Varunjikar et al. |
| 2018/0029632 A1 | 2/2018 | Bodtker et al. |
| 2018/0072341 A1 | 3/2018 | Schulz et al. |
| 2018/0093700 A1 | 4/2018 | Chandy |
| 2018/0105198 A1 | 4/2018 | Bodtker et al. |
| 2018/0107214 A1 | 4/2018 | Chandy |
| 2018/0136727 A1 | 5/2018 | Chandy |
| 2018/0148087 A1 | 5/2018 | Wang et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102027458 A | 4/2011 |
| CN | 102320324 A | 1/2012 |
| CN | 102452391 A | 5/2012 |
| CN | 202563346 U | 11/2012 |
| CN | 102939474 A | 2/2013 |
| CN | 103158699 A | 6/2013 |
| CN | 103419840 A | 12/2013 |
| CN | 103448785 A | 12/2013 |
| CN | 103677253 A | 3/2014 |

(56) References Cited

FOREIGN PATENT DOCUMENTS

| | | |
|---|---|---|
| CN | 103777632 A | 5/2014 |
| CN | 103818386 A | 5/2014 |
| CN | 104024084 A | 9/2014 |
| CN | 104968554 A | 10/2015 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102011056042 A1 | 6/2013 |
| DE | 102012010887 A1 | 12/2013 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2768034 B2 | 6/1998 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

CN Patent Application No. 201610575225.9 First Office Action dated Jan. 22, 2018, 10 pages.

English Translation of Chinese Office Action and Search Report for Chinese Application No. 201210599006.6 dated Jan. 27, 2015, 9 pages.

English Translation of Chinese Office Action and Search Report for Chinese Application No. 201310178012.9 dated Apr. 13, 2015, 13 pages.

English Translation of Chinese Office Action and Search Report for Chinese Application No. 201410089167.X dated Feb. 3, 2016, 9 pages.

English Translation of Chinese Office Action and Search Report for Chinese Application No. 2016103666609.X dated Dec. 20, 2017, 8 pages.

English Translation of Chinese Office Action and Search Report for Chinese Application No. 201610832736.4 dated Mar. 22, 2018, 6 pages.

European Application No. 12196665.9 Extended European Search Report dated Mar. 6, 2013, 7 pages.

European Search Report for European Patent Application No. 14156903.8 dated Jan. 27, 2015, 10 pages.

European Search Report for related European Application No. 15152834.6, dated Oct. 8, 2015; 7 pages.

Gillespie, Thomas D.; "Fundamentals of Vehicle Dynamics"; Society of Automotive Enginers, Inc.; published 1992; 294 pages.

Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.

Partial European Search Report for related European Patent Application No. 14156903.8, dated Sep. 23, 2014, 6 pages.

Van Der Jagt, Pim; "Prediction of steering efforts during stationary or slow rolling parking maneuvers"; Jul. 2013, 20 pages.

Varunjikar, Tejas; Design of Horizontal Curves With DownGrades Using Low-Order Vehicle Dynamics Models; A Theisis by T. Varunkikar; 2011; 141 pages.

Chinese Office Action and Search Report from the Chinese Patent Office for CN Application No. 201610575225.9 dated Oct. 16, 2018, 19 pages, English Translation Included.

Chinese Office Action and Search Report from the Chinese Patent Office for CN Application No. 201611096572.X dated Aug. 1, 2018, 20 pages, English Translation Included.

Chinese Office Action from the Chinese Patent Office for CN Application No. 2017102318205 dated Oct. 12, 2018, 7 pages, English Translation Only.

Chinese Office Action from the CN Patent Office for CN Application No. 201610832736.4 dated Oct. 16, 2018, 18 pages, English Translation Included.

Yan, et al., "EPS Control Technology Based on Road Surface Conditions," Jun. 22-25, 2009, pp. 933-938, 2009 IEEE International Conference on Information and Automation.

\* cited by examiner

STEERING SYSTEM HAVING ANTI-THEFT CAPABILITIES

BACKGROUND

Vehicles are generally provided with an anti-theft system such as door locks, alarms, or a steering column lock. Vehicles provided advanced steering systems having wireless communication between the steering columns and vehicle wheels, some anti-theft systems may be ineffective against unauthorized use of the vehicle. Accordingly it is desirable to provide an anti-theft system for vehicles having advanced steering systems.

SUMMARY

According to an embodiment of the present disclosure, a steering system is provided. The steering system includes an electric power steering system and a controller. The controller is in communication with the electric power steering system and is configured to verify an operator. The controller is programmed to, in response to a first signal indicative of a non-verified operator and a request to operate the steering system, provide the first signal to the electric power steering system and inhibit operation of the electric power steering system.

According to another embodiment of the present disclosure, a steering system for an autonomous or semi-autonomous vehicle is provided. The steering system includes a controller that is in communication with an electric power steering system and a transmission control system. The controller is programmed to, in response to a first signal indicative of a non-verified operator and a request to operate, place the electric power steering system in a standby mode and inhibit the transmission control system from changing at least one of a transmission operational state and a transmission operational position.

According to yet another embodiment of the present disclosure, a steering system for a vehicle is provided. The steering system includes an electric power steering system that is operatively connected to a steerable wheel and a controller. The controller is in communication with the electric power steering system and a braking system that is operatively connected to at least one of the steerable wheel and a non-steerable wheel. The controller is programmed to, in response to a first signal indicative of a non-verified operator and a request to operate, provide the first signal to the electric power steering system and inhibit operation of the vehicle.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
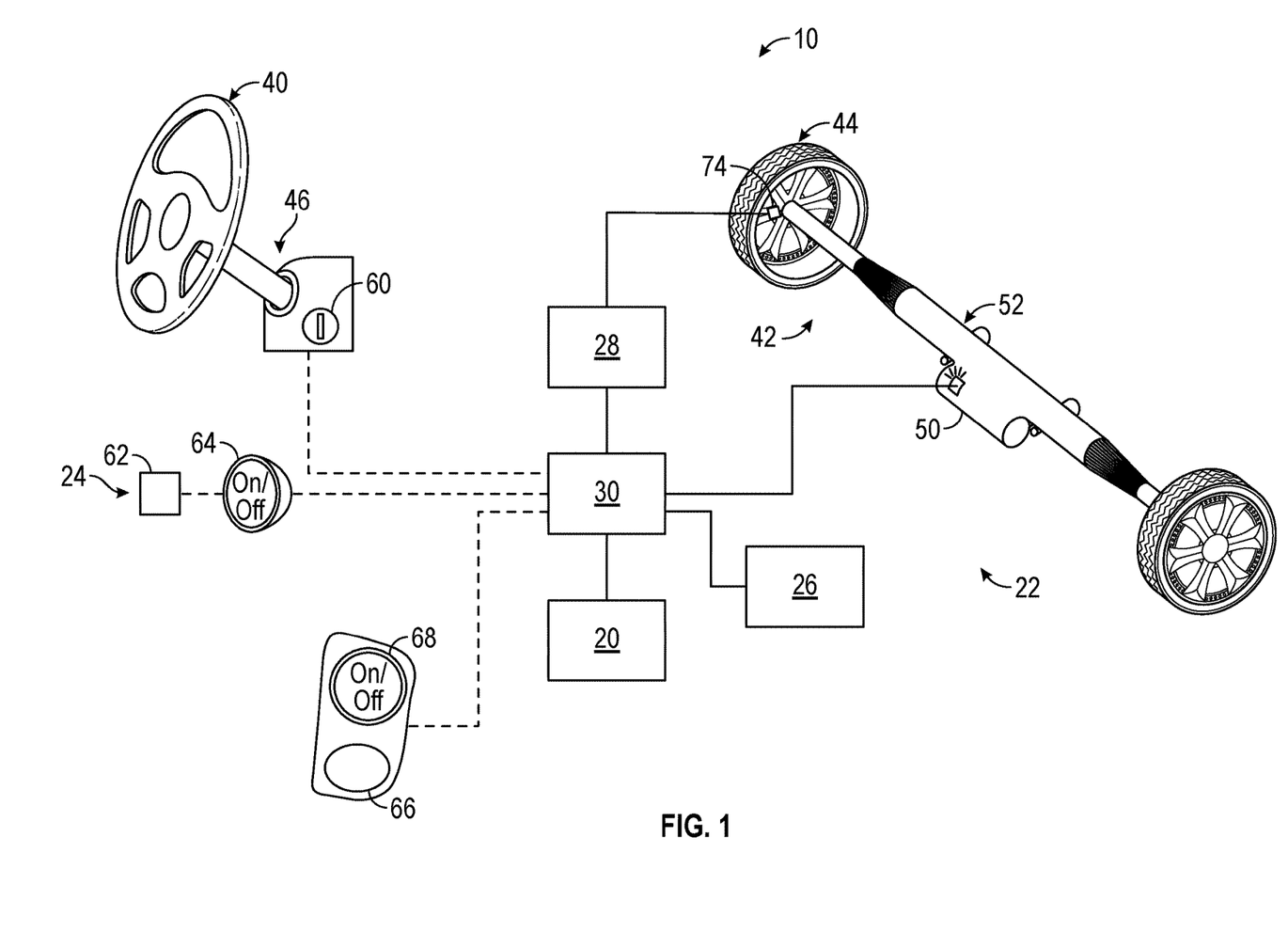
FIG. 1 a schematic illustration of a vehicle.

Referring to FIG. 1, a vehicle 10 is shown. The vehicle 10 may be a non-autonomous vehicle, an autonomous vehicle, a semi-autonomous vehicle, an autonomously driven vehicle, or a selectively autonomous vehicle. The vehicle 10 includes an automated driving assisted steering system (ADAS) 20, an electric power steering system 22, a vehicle system 24, a transmission control system 26, a braking system 28, and a controller 30.

The ADAS 20 enables the vehicle 10 to be fully controlled autonomously or to be at least partially autonomously controlled using sensing, steering, and/or braking technology without continuous input from a driver (e.g. steering, accelerating, braking, maneuvering, etc.). The ADAS 20 may be in communication with vehicle sub-systems such as the electric power steering system 22, the vehicle system 24, the transmission control system 26, the braking system 28, the controller 30, and other vehicle sub-systems that may affect operation of the vehicle 10. In at least one embodiment, the ADAS 20 is provided as part of the controller 30. A driver of the selectively autonomous vehicle is able to selectively activate or deactivate the ADAS 20 via a switch or other mechanism. A vehicle control system or monitoring system is able to selectively activate or deactivate the ADAS 20 in response to events occurring internal or external to the vehicle 10.

The ADAS 20 and the electric power steering system 22 may comprise a steering system of the vehicle 10. The electric power steering system 22 may include a steering wheel 40, a steering assembly 42, and a steerable wheel 44. The steering wheel 40 is connected to a steering column 46. The combination of the steering wheel 40 and the steering column 46 may be adjustable such that the combination is extendable or retractable along a longitudinal axis that extends from the steering column 46. The combination of the steering wheel 40 and the steering column 46 may be in the extended position while the ADAS 20 is deactivated. The combination of the steering wheel 40 and the steering column 46 may move from the extended position towards the retracted position in response to activation of the ADAS 20, such that the combination of the steerable wheel 44 and the steering column 46 are in the retracted position while the ADAS 20 is activated. The extended position corresponds to a position in which a driver of the vehicle 10 is able to provide steering input via the steering wheel 40. The retracted position corresponds to a position in which the driver of the vehicle 10 is not required to provide steering input via the steering wheel 40.

The steering wheel 40 is switchable between a rotatable condition and a non-rotatable condition. The steering wheel 40 is in a rotatable condition when the ADAS 20 is deactivated. The driver of the vehicle 10 is able to provide directional control of the vehicle 10 through the steering wheel 40 while the ADAS 20 is deactivated. The steering wheel 40 is in a non-rotatable condition while the ADAS 20 is activated. The steering wheel 40 is inhibited from rotating while in the non-rotatable condition. The steering wheel 40 is in the non-rotatable condition while the steering wheel 40 is operatively decoupled from the steering assembly 42. It is to be appreciated that decoupling the steering wheel 40 from the steering assembly 42 may be done mechanically, electrically, or a combination thereof.

The electric power steering system 22 may be configured or arranged as a steer-by-wire system such that the steering system of the vehicle 10 is a steer-by-wire steering system that does not have a direct mechanical connection between the steering wheel 40 and/or the steering column 46 and the steering assembly 42. The steering wheel 40 may be directly or indirectly selectively coupled to the steering assembly 42. The steerable wheel 44 may be directly or indirectly selectively coupled to the steering assembly 42 through a steering shaft or a wired or wireless connection via the controller 30. The steerable wheel 44 may be coupled to the steering assembly 42 while the ADAS 20 is deactivated. The steerable wheel 44 may be decoupled from the steering assembly 42 while the ADAS 20 is activated and controlling or maneuvering the vehicle 10.

The steering assembly 42 is arranged to pivot or turn the steerable wheel 44 in response to rotation of the steering wheel 40 or commands provided by the ADAS 20 to pivot or turn the steerable wheel 44.

The steering assembly 42 includes a housing 50 and a steering mechanism 52. In at least one embodiment, the housing 50 is arranged to receive the controller such that the controller 30 is disposed within the housing 50. The housing 50 is arranged to receive at least a portion of the steering mechanism 52. The steering mechanism 52 extends from the housing 50 and is arranged to pivot the steerable wheel 44 in response to rotation of the steering wheel 40 and/or commands provided by the ADAS 20. The steering mechanism 52 may be configured as a steering rack having rack and pinion steering, or the like.

The steering mechanism 52 includes a device, such as a rotary encoder, that interprets rotation of the steering wheel 40 and applies information to an actuator that rotates, translates, or pivots, a portion of the steering mechanism 52 to pivot the steerable wheel 44. The device provides a signal to the actuator while the ADAS 20 is deactivated. The device does not provide a signal or the signal is ignored by the actuator while the ADAS 20 is activated.

The vehicle system 24 is a system that is arranged to provide a request to operate the vehicle 10 and/or is arranged to verify an operator of the vehicle 10. The vehicle system 24 operates as a verification source to verify that an operator of the vehicle is authorized or verified to operate the vehicle 10. Should the vehicle system 24 not verify that an operator of the vehicle is authorized or verified operate vehicle 10, the vehicle system 24 may inhibit the operation of the vehicle 10.

The vehicle system 24 may include a vehicle ignition 60 that is arranged to receive a key. The acceptance of the key and the rotation or depression of the vehicle ignition 60 and the provision of a start signal via the vehicle ignition 60 or the controller 30 verifies that the holder of the key is a verified operator of the vehicle 10. The non-acceptance of the key or the non-rotation or inhibition of depression of the vehicle ignition 60 does not provide the start signal via the vehicle ignition 60 or the controller 30 and does not verify the thought of the key is verified operator of vehicle 10.

In other embodiments, the vehicle system 24 includes a key fob detector 62 and a fob ignition 64. The vehicle system 24 enables an operator of the vehicle 10 to provide a request to operate the vehicle 10 via the fob ignition 64 in response to the key fob detector 62 detecting a key fob that is paired with the vehicle 10. The vehicle system 24 inhibits an operator of vehicle 10 from providing a request to operate the vehicle 10 via the fob ignition 64 in response to the key fob detector 62 not detecting a key fob that is paired of the vehicle 10.

In other embodiments, the vehicle system 24 includes a driver verification system 66. The driver verification system 66 is arranged to verify the identity of an operator of the vehicle using biometrics, a pin code, a key fob, or the like. The vehicle system 24 enables an operator of the vehicle 10 to provide a request to operate the vehicle 10 via an ignition switch in response to the driver verification system 66 verify the identity of an operator of the vehicle 10. The vehicle system 24 inhibits an operator of the vehicle 10 from providing a request to operate the vehicle 10 via the ignition switch 68 in response to the driver verification system 66 not detecting a verified operator of the vehicle 10.

The vehicle system 24 is arranged to provide a first signal indicative of a non-verified operator of the vehicle 10 to a vehicle sub-system such as at least one of a fuel injection system, a transmission control module, an engine control module, the electric power steering system 22, the transmission control system 26, the braking system 28, and the controller 30, in response to the vehicle system 24 not detecting or not verifying a verified operator of the vehicle 10. In at least one embodiment, the vehicle system 24 is arranged to provide the first signal to at least one of the above mentioned vehicle sub-systems and another vehicle sub-system of the above mentioned vehicle sub-systems and inhibit operation of at least one of the above mentioned vehicle sub-systems and another vehicle sub-system of the above mentioned vehicle sub-systems. The vehicle system 24 is arranged to provide a second signal indicative of a verified operate the vehicle 10 to a vehicle sub-system such as at least one of a fuel injection system, a transmission control module, an engine control module, the electric power steering system 22, the transmission control system 26, the braking system 28, and the controller 30, in response to the vehicle system 24 detecting or verifying a verified operator of the vehicle 10. In at least one embodiment, the vehicle system 24 is arranged to provide the second signal to at least one of the above mentioned vehicle sub-systems and another vehicle sub-system of the above mentioned vehicle sub-systems and enable/facilitate operation of at least one of the above mentioned vehicle sub-systems and another vehicle sub-system of the above mentioned vehicle sub-systems.

The transmission control system 26 is in communication with a vehicle transmission. The transmission control system 26 is arranged to change at least one of a transmission operational state and a transmission operational position in response to a verified operator of the vehicle 10 requesting a change in the transmission operational state and or transmission operational position. The transmission control system 26 inhibits the vehicle transmission from being changed from a park state (park position) to a reverse state (reverse position), neutral state (neutral position) or drive state (drive position) in response to the vehicle system 24 providing a first signal indicative of a non-verified operate the vehicle 10. The transmission control system 26 enables the vehicle transmission to be changed from a park state (park position) to a reverse state (reverse position), neutral state (neutral position) or drive state (drive position) in response to the vehicle system 24 providing a second signal indicative of a verified operate the vehicle 10.

The braking system 28 is operatively connected to at least one of the steerable wheel 44 and a non-steerable wheel of the vehicle 10. The braking system 28 is in communication with a brake 74 that is arranged to selectively inhibit or facilitate rotation of at least one of the steerable wheel 44 and the non-steerable wheel. The brake 74 may be an electrically actuated parking brake. The braking system 28 is operated to actuate or operate the brake 74 to inhibit rotation of at least one of the steerable wheel 44 and a non-steerable wheel of the vehicle 10 in response to the vehicle system 24 providing a first signal indicative of a non-verified operator of the vehicle 10. The braking system 28 is operated to actuate or operate the brake 74 to facilitate or enable rotation of at least one of the steerable wheel 44 and a non-steerable wheel of the vehicle 10 in response to the vehicle system 24 providing a second signal indicative of a verified operator of the vehicle 10.

In at least one embodiment, the vehicle system 24 is arranged to provide a first signal indicative of a non-verified operator of the vehicle 10 to another vehicle sub-system such as at least one of a throttle control/fuel injector control for a vehicle having an internal combustion engine, a logic drive (MOSFET) control for a vehicle having an electric drive, and the controller 30 to inhibit operation of at least one of the throttle control/fuel injector control and the logic drive (MOSFET) control, in response to the vehicle system 24 not detecting or not verifying a verified operator of the vehicle 10. The vehicle system 24 is arranged to provide a second signal indicative of a verified operate the vehicle 10 to at least one of a throttle control/fuel injector control for a vehicle having an internal combustion engine, a logic drive (MOSFET) control for a vehicle having an electric drive, and the controller 30 to enable operation of at least one of the throttle control/fuel injector control and the logic drive (MOSFET) control, in response to the vehicle system 24 detecting or verifying a verified operator of the vehicle 10.

The controller 30 may be provided as a separate component of the vehicle 10. At least one embodiment, the controller 30 may be provided as part of the ADAS 20 or may be provided as part of the electric power steering system 22 such that it is integrated into the housing 50. The controller 30 is configured to receive information or signals from the ADAS 20, a sensor associated with the ADAS 20, the electric power steering system 22, the vehicle system 24, the transmission control system 26, and the braking system 28.

The controller 30 includes a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in providing antitheft capabilities for the vehicle 10.

The controller 30 is programmed to provide the first signal indicative of a non-verified operator of the vehicle 10 to at least one of the electric power steering system 22, the transmission control system 26, the braking system 28, and another vehicle sub-system, in response to receiving a first signal indicative of a non-verified operator of the vehicle 10 from the vehicle system 24 and a request to operate the vehicle 10.

The controller 30 provides a signal or a command to the electric power steering system 22 to inhibit the electric power steering system 22 from being operated. The electric power steering system 22 will not respond to steer by wire commands input through the steering wheel 40 while the electric power steering system 22 is inhibited from being operated. The signal or the command may inhibit the provision of power to the electric power steering system 22. In at least one embodiment, the controller 30 provide a signal or a command to the electric power steering system 22 to operate the electric power steering system 22 to pivot the steerable wheel 44. The steerable wheel 44 may be pivoted left or right all the way to an end of travel of the steering mechanism 52. The pivoting of the steerable wheel 44 prevents or inhibits the vehicle 10 from being placed in neutral and pushed or rolled away from its current location.

The controller 30 may also provide a signal or a command to the transmission control system 26 to inhibit the transmission control system 26 from being operated. The signal or the command may inhibit the transmission control system 26 from changing at least one of the transmission operational state and the transmission operational position. The inhibiting of changing at least one of the transmission operational state and the transmission operational position prevents or inhibits the transmission of the vehicle 10 from being placed in neutral and being pushed or rolled away from its current location.

The controller 30 may also provide a signal or command to the braking system 28 to operate the braking system 28. The braking system 28 may be operated to inhibit rotation of at least one of the steerable wheel 44 and the non-steerable wheel by operating the brake 74. The locking of at least one of the steerable wheel 44 and a non-steerable wheel of the vehicle 10 by the brake 74 prevents or inhibits the rotation of a vehicle wheel to inhibit the vehicle 10 from being pushed or rolled away from its current location.

In at least one embodiment, the controller 30 may place the electric power steering system 22 in a standby mode in which the electric power steering system 22 is inhibited from operating. In further embodiments, prior to placing the electric power steering system 22 in the standby mode, the controller 30 provides a signal or a command the electric power steering system 22 to operate electric power steering system 22 to pivot the steerable wheel 44. The electric power steering system 22 remains in standby mode until the vehicle 10 is restarted and an operator of the vehicle is verified. This ensures that the vehicle 10 is not actually shut down during operation and the check is only performed at startup.

The controller 30 is programmed to provide the second signal indicative of a verified operator of the vehicle 10 to at least one of the electric power steering system 22, the transmission control system 26, and the braking system 28, in response to receiving the second signal indicative of a verified operator of the vehicle 10 from the vehicle system 24 and a request to operate the vehicle 10.

The controller 30 provides a signal or a command to the electric power steering system 22 to enable the electric power steering system 22 to be operated. The electric power steering system 22 may respond to steer by wire commands input through the steering wheel 40 while the electric power steering system 22 is enabled to be operated. The signal or the command may request that power be provided to the electric power steering system 22. In at least one embodiment, the controller 30 provide a signal or a command to the electric power steering system 22 to operate the electric power steering system 22 to straighten the steerable wheel 44.

The controller 30 may also provide a signal or a command to the transmission control system 26 to enable the transmission control system 26 to be operated. The signal or the command may enable the transmission control system 26 to change at least one of the transmission operational state and the transmission operational position such that the transmission of the vehicle 10 may be moved away from the park position or park state.

The controller 30 may also provide a signal or command to the braking system 28 to operate the braking system 28. The braking system 28 may be operated to enable or facilitate rotation of at least one of the steerable wheel 44 and the non-steerable wheel by releasing or not operating the brake 74. The releasing or non-operation of the brake 74 enables or facilitates the rotation of a vehicle wheel to inhibit the vehicle 10 from being pushed or rolled away from its current location.

In at least one embodiment, the controller 30 may remove the electric power steering system 22 from the standby mode in response to the second signal indicative of a verified operator of the vehicle 10 and a request to operate the vehicle 10.

The controller is further programmed to inhibit operation of the electric power steering system 22 in response to the provision of power to at least one of the controller 30, another vehicle system, and the electric power steering system 22. Power may be provided to at least one of these systems during an attempt by a person to hotwire the vehicle 10. The application of power to at least one of the electric power steering system 22 and the controller 30 absent at least one of the first signal indicative of a non-verified operator of the vehicle 10 and the second signal indicative of a verified operator of the vehicle 10. The controller 30 may provide a signal or command to the electric power steering system 22 to operate electric power steering system 22 to pivot the steerable wheel 44 to a left extreme or a right extreme.

Figure 2A:
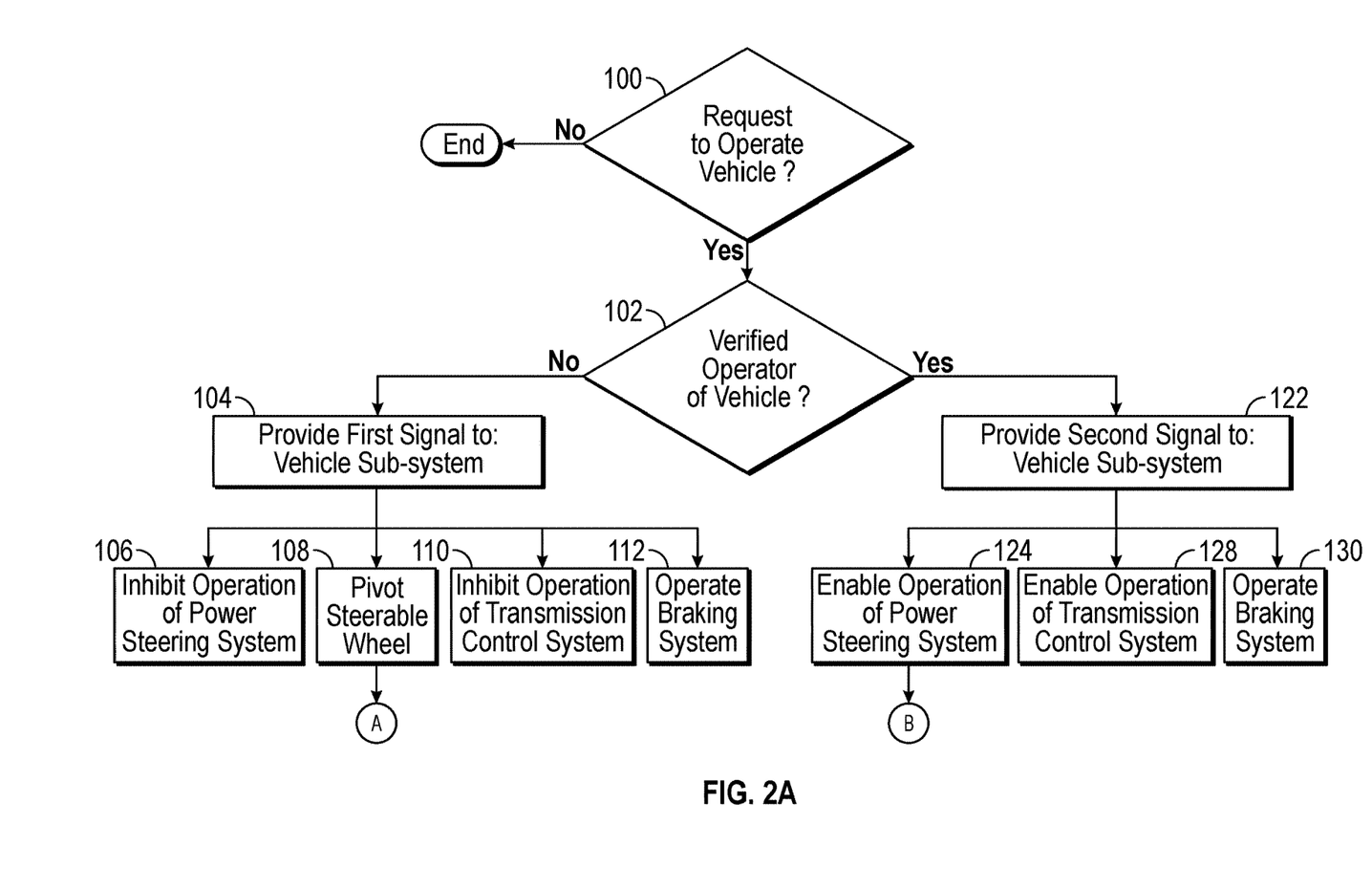
FIG. 2A is a flowchart illustrating a method of inhibiting unauthorized use of a vehicle.
Figure 2B:
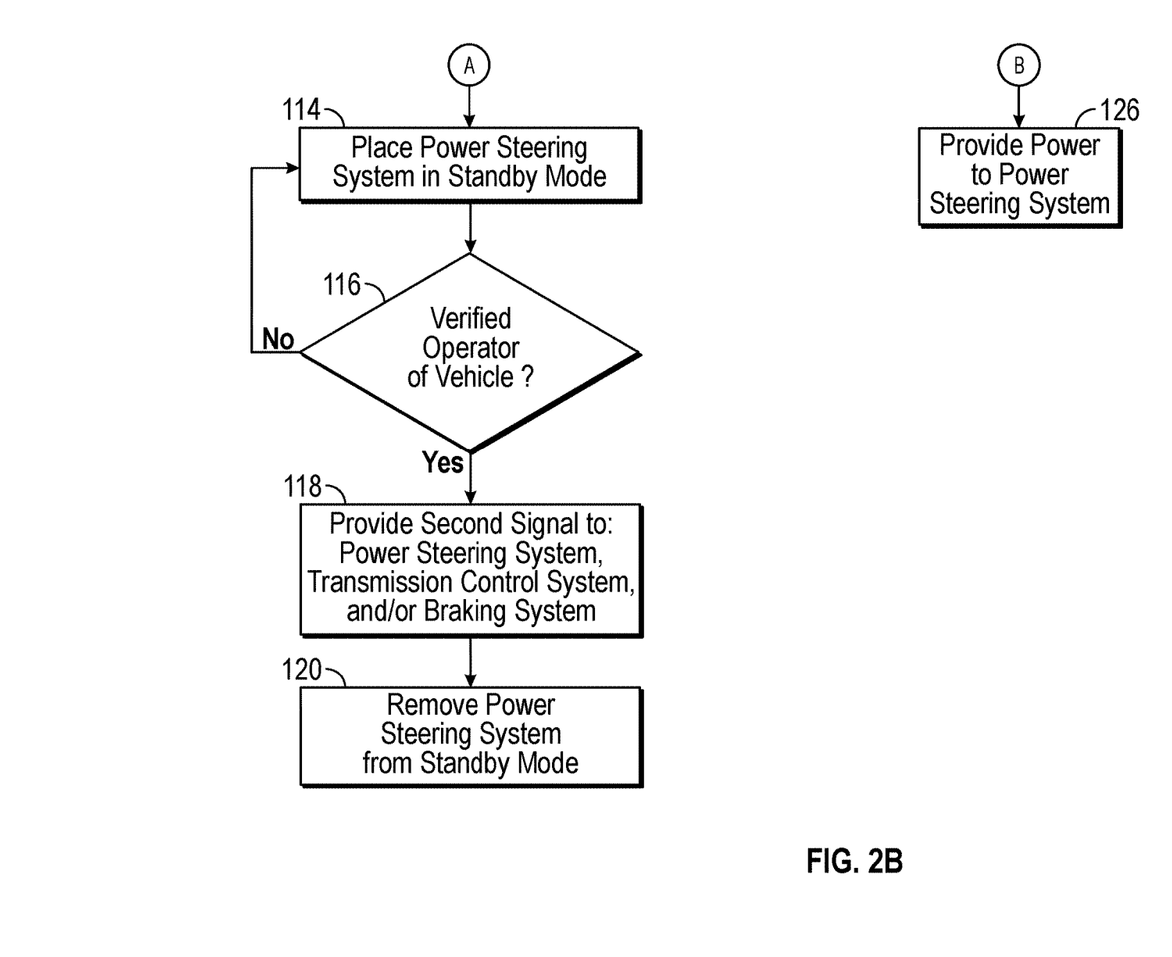
FIG. 2B is a continuation of the flowchart of FIG. 2A.

Referring to FIG. 2, a method of inhibiting unauthorized use of a vehicle is shown. As will be appreciated by one of ordinary skill in the art, the flowchart represents control logic that may be implemented or affected in hardware, software, or a combination of hardware and software. The various functions may be affected by a programmed microprocessor provided with the controller 30 or provided separately from the controller 30. The control logic may be implemented using any of a number of known programming and processing techniques or strategies and is not limited to the order or sequence illustrated. For instance, interrupt or event driven processing may be employed in real-time control applications rather than a purely sequential strategy is illustrated. Likewise, parallel processing, multitasking, or multi-threaded systems and methods may be used.

The method may be executed by the controller 30 and may be implemented as a closed loop control system. For brevity, the method will be described in the context of a single iteration of the method. The method may be performed prior to or during a start sequence of the vehicle 10.

At block 100, the method assesses whether a request to operate the vehicle 10 is provided. If a request to operate the vehicle 10 is not provided, the method may end. Should a request to operate the vehicle 10 be provided, the method continues to block 102.

At block 102, the method determines whether an operator of the vehicle is verified or not. If an operator of the vehicle is not verified by the vehicle system 24, the vehicle continues to block 104.

At block 104, the vehicle system 24 provides a first signal indicative of a non-verified operator of the vehicle 10 to a vehicle sub-system such as at least one of the electric power steering system 22, the transmission control system 26, the braking system 28, a throttle control/fuel injector control, and a logic drive (MOSFET) control. The method may then proceed to perform at least one or a combination of the following processes: inhibit operation of the electric power steering system 22, at block 106; operate the electric power steering system 22 to pivot the steerable wheel 44, at block 108; inhibit operation of the transmission control system 26, at block 110; and operate the braking system 28, block 112.

At block 114, the method may place the electric power steering system 22 in a standby mode awaiting a subsequent request to operate the vehicle 10 and a signal indicative of a verified operator of the vehicle 10.

At block 116, the method assesses whether a subsequent request to operate the vehicle 10 is received and is provided by a verified operator of the vehicle 10. If a subsequent request to operate the vehicle 10 is not received or is not provided by a verified operator of the vehicle 10, the method returns to block 114 and the electric power steering system 22 remains in standby mode. Should a subsequent request to operate the vehicle 10 be received and is provided by a verified operator of the vehicle 10, the method provides the second signal indicative of a verified operator of the vehicle 10 to at least one of the electric power steering system 22, the transmission control system 26, and the braking system 28, at block 118. The method then removes the electric power steering system 22 from the standby mode at block 120.

Returning to block 102, the method determines whether an operator of the vehicle 10 is verified. Should an operator of the vehicle be verified, the vehicle 10 continues to block 122. At block 122, the method provides the second signal indicative of a verified operator of the vehicle 10 to a vehicle sub-system such as at least one of the electric power steering system 22, the transmission control system 26, the braking system 28, a throttle control/fuel injector control, and a logic drive (MOSFET) control.

The method may then proceed to perform at least one of or a combination of the following processes: enable operation of the electric power steering system 22, at block 124; wherein enabling operation of the electric power steering system 22 includes providing power to the electric power steering system 22, at block 126; enable operation of the transmission control system 26, at block 128; and operate the braking system 28 to enable or facilitate rotation of at least one of the steerable wheel 44 and a non-steerable wheel, at block 130.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering system, comprising:
   an electric power steering system; and
   a controller in communication with the electric power steering system and is configured to verify an operator, the controller being programmed to, in response to a first signal indicative of a non-verified operator and a request to operate the steering system, provide the first signal to the electric power steering system, and operate the electric power steering system to pivot a steerable wheel.

2. The steering system of claim 1, wherein the controller is further programmed to, in response to the first signal, to inhibit operation of another vehicle subsystem.

3. The steering system of claim 1, wherein the controller is integrated into a housing of the electric power steering system.

4. The steering system of claim 1, wherein the controller is further programmed to, in response to a second signal indicative of a verified operator, provide the second signal to at least one of the electric power steering system and another vehicle sub-system.

5. The steering system of claim 4, wherein the controller is further programmed to, provide power to the electric power steering system.

6. The steering system of claim 4, wherein the controller is further programmed to, in response to an application of power to at least one of the controller and the electric power steering system, absent at least one of the first signal and the second signal, operate the electric power steering system to pivot the steerable wheel.

7. A steering system for an autonomous or semi-autonomous vehicle, comprising:
   a controller in communication with an electric power steering system and a transmission control system, the controller being programmed to, in response to a first signal indicative of a non-verified operator and a request to operate, place the electric power steering system in a standby mode and inhibit the transmission control system from changing at least one of a transmission operational state and a transmission operational position.

8. The steering system of claim 7, wherein the controller is further programmed to, prior to placing the electric power steering system in the stand by mode, operate the electric power steering system to pivot a steerable wheel.

9. The steering system of claim 7, wherein the controller is further programmed to, in response to a second signal indicative of a verified operator and the request to operate, remove the electric power steering system from the standby mode.

10. The steering system of claim 9, wherein the controller is further programmed to, enable the transmission control system to change at least one of the transmission operational state and the transmission operational position.

11. The steering system of claim 10, wherein the controller is further programmed to, enable operation of the electric power steering system.

12. A steering system for a vehicle, comprising:
    an electric power steering system operatively connected to a steerable wheel; and
    a controller in communication with the electric power steering system and a braking system operatively connected to at least one of the steerable wheel and a non-steerable wheel, the controller being programmed to, in response to a first signal indicative of a non-verified operator and a request to operate, provide the first signal to the electric power steering system, inhibit operation of the vehicle, and operate the braking system to inhibit rotation of at least one of the steerable wheel and the non-steerable wheel.

13. The steering system of claim 12, wherein the controller is further programmed to, in response to a second signal indicative of a verified operator and the request to operate, provide the second signal to the electric power steering system, enable operation of the vehicle, and operate the braking system to facilitate rotation of at least one of the steerable wheel and the non-steerable wheel.

14. The steering system of claim 12, wherein the controller is in further communication with a transmission control system.

15. The steering system of claim 14, wherein the controller is further programmed to inhibit the transmission control system from changing at least one of a transmission operational state and a transmission operational position.

16. The steering system of claim 15, wherein the controller is further programmed to, in response to a second signal indicative of a verified operator and the request, provide the second signal to the transmission control system and the electric power steering system, enable the electric power steering system to operate, and enable the transmission control system to change at least one of a transmission operational state and a transmission operational position.

17. The steering system of claim 12, wherein inhibiting operation of the vehicle includes inhibiting operation of at least one of the electric power steering system and another vehicle sub-system.

18. The steering system of claim 12, wherein the controller is further programmed to operate the electric power steering system to pivot the steerable wheel.

* * * * *